INVENTOR.
WILLIAM J. CASEY

June 10, 1969  W. J. CASEY  3,448,837
RAILWAY BRAKE SAFETY DEVICE

Filed Sept. 15, 1967

INVENTOR.
WILLIAM J. CASEY
BY
ATTYS

United States Patent Office 3,448,837
Patented June 10, 1969

---

3,448,837
RAILWAY BRAKE SAFETY DEVICE
William J. Casey, Highland Park, Ill., assignor to Amsted Industries Incorporated, Chicago, Ill., a corporation of New Jersey
Filed Sept. 15, 1967, Ser. No. 667,923
Int. Cl. F16d 65/14
U.S. Cl. 188—210                                6 Claims

ABSTRACT OF THE DISCLOSURE

A railway brake arrangement having brake levers pivotally connected to bifurcated ends of a brake compression rod by pins and having a secondary means of connection comprised of keepers on the brake levers engaged in openings formed on one side of the bifurcated ends of the brake compression rod. The keepers slide within the openings thereby retaining the brake compression rod in the absence of the connecting pins.

---

This invention relates to railway brake rigging and more particularly to a new and improved safety device to be used on railway brake compression rods to prevent such rods, in the event of failure of pivotal connection with a brake lever, from falling onto the railway road bed and creating a hazardous condition.

It is, therefore, an object of this invention to provide a new and improved safety device for railway brake compression rods.

Other objects and advantages of this invention will become apparent from the following description and drawings wherein.

Figure 1:
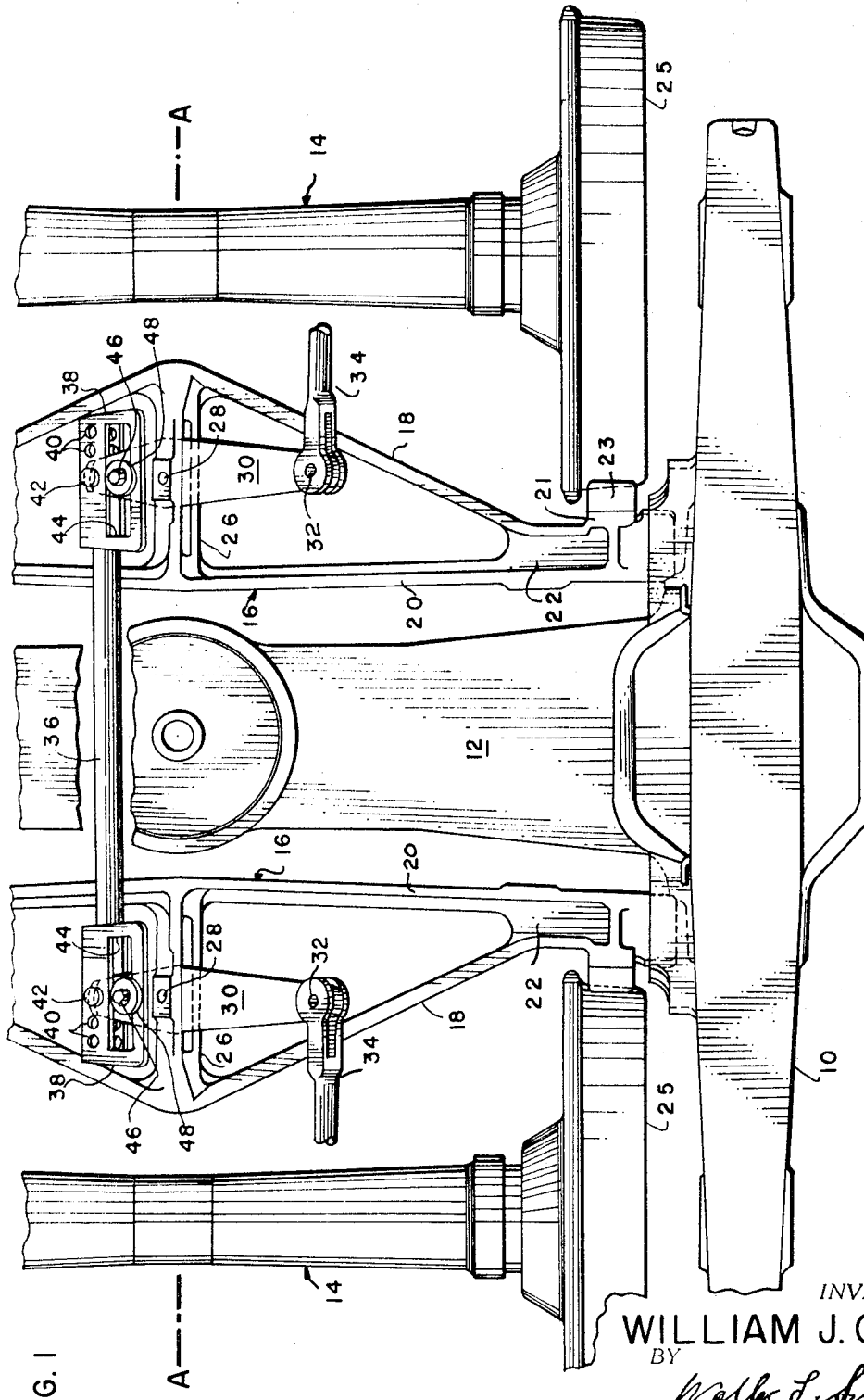
FIGURE 1 is a top fragmentary view of a railway truck equipped with brake rigging and embodies features of the invention herein described.

Referring now to the drawings, part of a railway car truck is shown in FIGURE 1 comprising a side frame 10 associated with a bolster 12 and wheel and axle assemblies 14. The car truck is symmetrical on either side of the longitudinal axis A—A, and is of a design and construction known in the art.

Brake rigging is provided on the railway car truck comprising brake beams 16 having tension and compression members 18 and 20 joined at 22 and interconnected intermediate their ends by a strut 26 having a fulcrum slot 28 for pivotal connection of a brake lever 30. A brake head 21 is located proximate either end of the brake beam 16 and retains a brake shoe 23 which is engageable with a railway car wheel 25.

The brake levers 30 are pivotally connected at their upper ends 32 to brake rods 34, which connect actuating means and other brake rigging known in the art (not shown).

A brake compression rod 36 operatively interconnects brake levers 30 and comprises bifurcated ends 38 having a plurality of aligned openings 40 for adjustment of the brake rigging. The lower ends of the brake levers 30 extend into the bifurcated ends 38 of the brake compression rod 36 and are pivotally connected thereto by pins 42.

Figure 2:
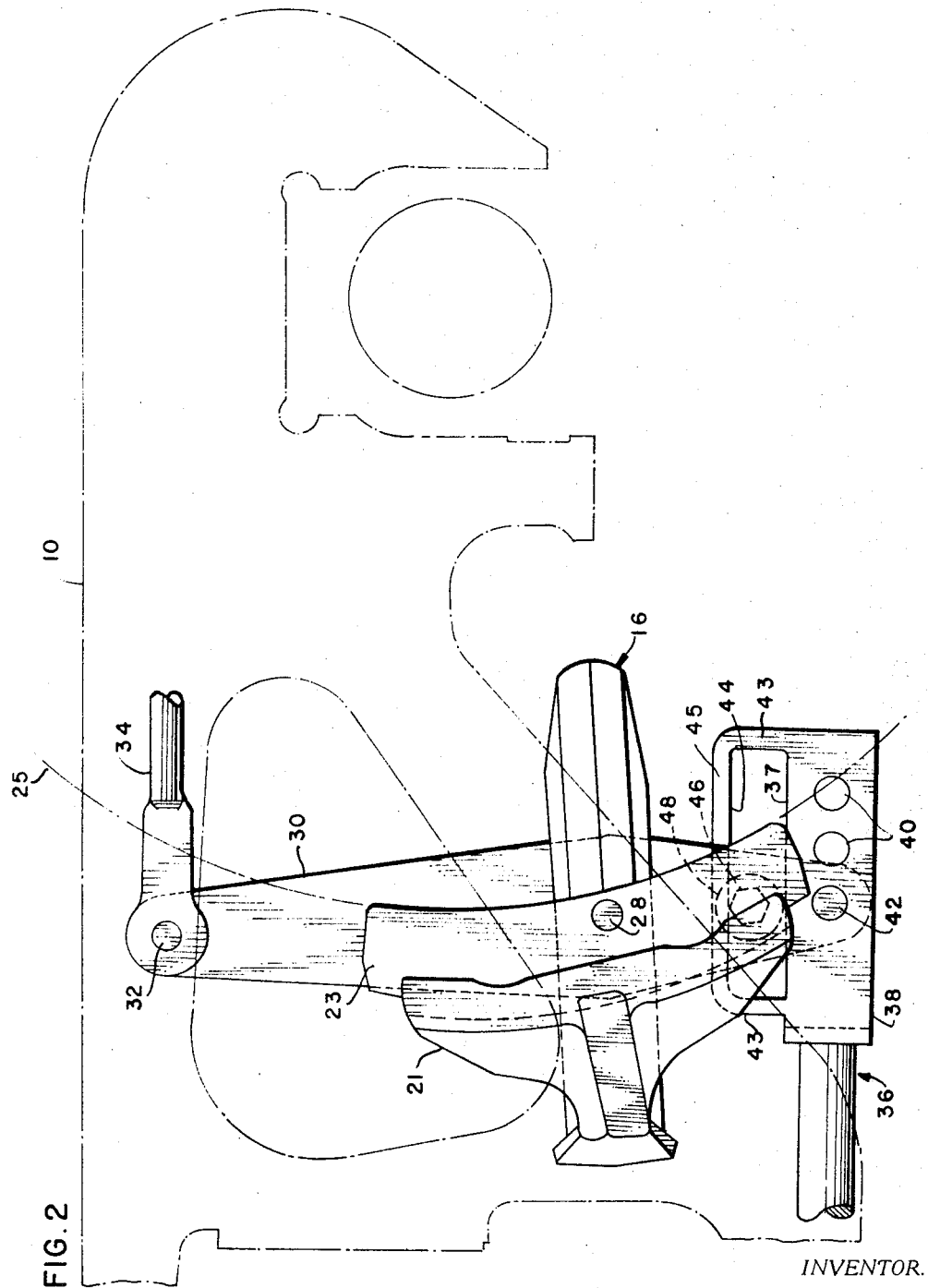
FIGURE 2 is a fragmentary side view of FIGURE 1.

The safety device, as shown in FIGURE 2, is part of the brake compression rod 36 and comprises an opening 44 formed by parallel side walls 43 extending upwardly from the edge 37 of a bifurcated end 38 of the brake compression rod 37 and interconnected by a top wall 45. A bolt 46, secured to a brake lever 30, rides in the opening 44.

Figure 3:
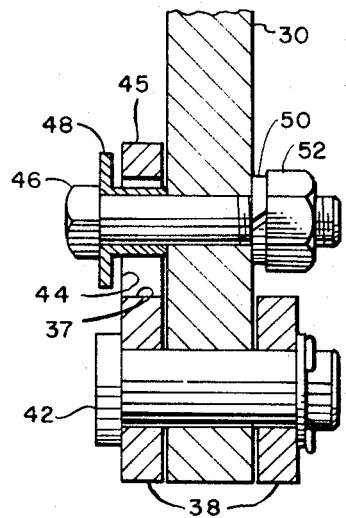
FIGURES 3 and 4 are schematic cross-sectional views illustrating means of connecting a brake compression rod and brake lever and embody features of this invention.
Figure 4:
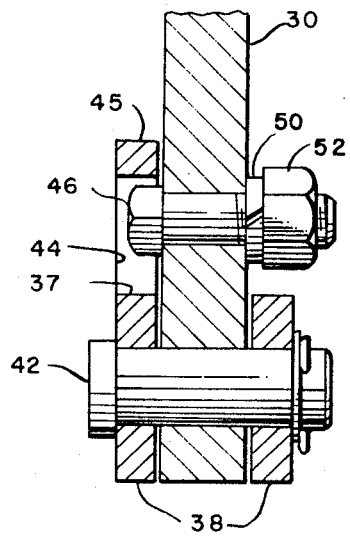

FIGURE 3 illustrates a preferred arrangement of the invention wherein the bifurcated end 38 of a brake compression rod 36 is pivotally connected to a brake lever 30 by a pin 42. A bolt 46 is associated with a spacer 48 and secured to the brake lever 30 by a lock washer 50 and a nut 52. The spacer 48 rides in the opening 44.

After prolonged pivotal movement of the brake lever 30 and brake compression rod 36, the pin 42 may become worn and fail in service permitting the brake compression rod 36 (in the absence of the safety device) to fall to the road bed causing serious brake damage and possible derailment of the railway car. With the safety device, the brake compression rod 36 can only drop until engagement is made between the top wall 45 of the opening 44 and the spacer 48 secured to the brake lever 30. Because the spacer 48 does not engage the sides of the opening 44 during pivotal connection of the brake compression rod 36 and brake lever 30, the spacer 48 is free from frictional wear until an emergency condition occurs, i.e. failure of pin 42.

Previous brake rod safety devices were made by extending the lever 30 down through the bifurcated ends 38 of the brake compression rod 36, providing an arm perpendicular to the brake lever 30 at its lower end, and enclosing the open side of the bifurcated end 38. Although these devices were effective, they often reduced needed clearance between the railway truck and road bed. An advantage of this invention is that the safety device may be located above the brake compression rod without creating a clearance problem.

The opening 44 may be formed as either a part of the bifurcated end 38 of the brake compression rod 36 or by a bracket secured to existing brake compression rods. The safety device is not solely limited to bottom brake compression rods as shown, but may be used on any similar brake rod or member.

I claim:

1. In a railway vehicle brake rigging wherein brake lever is operatively connected, a safety device comprising a brake rod having pivotal connections to said brake levers, openings formed on the brake rod adjacent to the pivotal connections, means secured to the brake levers and riding in the openings for supporting the brake rod from the brake levers in the absence of the pivotal connections.

2. In a railway vehicle brake rigging wherein brake levers are operatively connected, a safety device comprising a brake compression rod having bifurcated ends, the brake levers extending into the ends and pivotally connected thereto, openings formed on one side of each bifurcated end, means secured to the brake levers and riding in said openings for supporting the brake compression rod from the brake levers in the absence of the pivotal connection.

3. A railway vehicle brake rigging according to claim 2 in which the opening comprises spaced side walls extending upward from one edge of a bifurcated end and interconnected by a top wall.

4. A railway vehicle brake rigging according to claim 3 in which said means comprises a bolt associated with a spacer.

5. A railway vehicle brake rigging according to claim 4 in which openings are formed on both sides of a bifurcated end of a brake compression rod.

6. In a railway vehicle brake rigging wherein a brake lever is operatively connected, a safety device comprising a brake rod having a pivotal connection with said brake lever, at least one opening formed on the brake rod adjacent to the pivotal connection, means secured to the brake lever and riding in said opening for supporting the brake rod from the brake lever in the absence of the pivotal connection.

References Cited

UNITED STATES PATENTS

| | | | |
|---|---|---|---|
| 1,751,661 | 3/1930 | Schaefer | 188—210 X |
| 3,384,207 | 5/1968 | Simanek | 188—210 |

DUANE A. REGER, *Primary Examiner.*